Jan. 7, 1930.  A. STOCKSTROM  1,742,880

SELF CONTAINED AUTOMATIC GAS HEATER

Filed June 4, 1928  4 Sheets-Sheet 1

FIG. 1.

Inventor
A. Stockstrom,
By A. S. Pattison
Attorneys.

Jan. 7, 1930.  A. STOCKSTROM  1,742,880
SELF CONTAINED AUTOMATIC GAS HEATER
Filed June 4, 1928  4 Sheets-Sheet 2

Patented Jan. 7, 1930

1,742,880

UNITED STATES PATENT OFFICE

ARTHUR STOCKSTROM, OF ST. LOUIS, MISSOURI, ASSIGNOR TO AMERICAN STOVE COMPANY, OF ST. LOUIS, MISSOURI, A CORPORATION OF NEW JERSEY

SELF-CONTAINED AUTOMATIC GAS HEATER

Application filed June 4, 1928. Serial No. 282,642.

This invention relates to improvements in self contained automatic gas heaters and the invention is for the purpose of heating a room or rooms in which the said heater is placed.

The primary object of this invention is to embody as a part of a heater a thermostat that is controlled by the temperature of the room in which the heater is placed.

Another object of the present invention is to so locate the thermostatic control in the heater that all of the cold air that enters the heater is compelled to pass by the thermostat, thus serving to maintain at the proper temperature for warming the air of the room to the desired degee of heat.

Another object of the invention is to so constuct the heater and to locate the thermostat in the said construction that all of the cold air fed to the heater is caused to influence the said thermostat, thereby making the thermostat as an integral part of the said heater.

A further object of the present invention is to specially construct the heater that it is adapted to receive a double burner that is controlled by a thermostat and to cause the circulation of all of the air to the heater to flow by and influence the said thermostat for the purpose of making the structure a complete automatic device.

Another object of the invention is to so contsruct the heater, the burner and the thermostat whereby the burner and the thermostat are readily removed as integral members for the purpose of examination and repair.

Another object of the present invention is to so construct the heater, the burner and the thermostat that the burner or burners and the thermostatic control comprise a single detachable unit, whereby the burner or burners and the thermostat are readily bodily removable from the heater construction for the purpose of enabling the thermostat and the burners to be examined or repaired.

Another object of the present invention is to so construct the burners and the thermostat attached to the burners and to make the gas and the thermostatic controls very sensitive and yet capable of sufficient movement to make a practical structure for automatically controlling the gas supply for heating a room.

The present object of the present invention is to so construct the heater, the burner, the manifold and the thermostat that they comprise a single unit that is adapted to control automatically the heat of a room.

Another object of the present invention is to so construct the heater that it is adapted to receive burners and the thermostat and adapted to cause a circulation of the cold air of the room in the heater whereby substantially all of the heat from the burner or burners is utilized for heating the air of the room.

Other objects of the invention will appear from the following disclosure and description.

In carrying out the present invention the heater comprises an outer case 1 and an inner case 2. Located in the lower end of the inner case 2 are suitable baffles 3, 4, 5, and 6 past which all of the air for the heater flows in a manner which will be described hereinafter.

The burner and thermostatic unit comprises a vertical housing 7 in which is placed the levers 8 and 9 which are adapted to control the flow of gas to the said housing and to the burners 10 and 11 through the medium of a thermostatic member 12 which is of the ordinary construction and which will very briefly be described presently. The lower end of the lever 8 is journaled on a pivot 13 which is fixed to the walls of the housing 7 and its upper end is pivotally connected at 14 with the upper end of the lever 9. A reciprocating member 15 extends in a direction parallel with the said thermostat, its right hand end 16 moving in a suitable journal or socket 17 while its opposite end is seated in a socket 18 that is a part of the gas control valve 19. This valve 19 controls the flow of gas through an opening 20 that is formed in the lower inner end of the housing 7. The housing at this point has an inwardly projecting extension 21 which is provided with a gas inlet opening 22 to which opening a suitable gas supply (not shown) is connected.

The cap 23 is screw threaded in the open end of the extension 21 and a spiral spring 24 is located between the said cap 23 and the gas control valve 19, the said gas control valve being normally held closed by the said spiral spring. The lower end 25 of the lever 9 is provided with forked members 26 that extend at each side of the center 27 of the member 15. These forked members 26 are located between the collars 28 and 29 and engage the collar 29 when the lever 9 is moved to open the said gas valve 19 and is moved to engage the collar 28 when the said gas valve 19 is closed. This arrangement permits the lever to have some outward movement between the extensions 28 and 29 without affecting the gas valve 19.

The thermostatic member 12 consists preferably of an expanding copper tube 30 and an inner porcelain substantially non-expansible member that has its inner end 32 engage a projection 33 on the lower portion of the lever 8 just above the lower pivoted end of the said lever.

An adjustable member 34 is screw-threaded into the upper portion of the outer wall of the housing 7 and it engages the upper portion of the lever 9 just below its pivoted point 14 with the lever 8 and the outer end of the member 34 carries a wheel 35 and by means of said wheel the member 34 is adjusted back and forth. The periphery of the hand wheel 35 is provided with numbers 36 that will indicate its adjustment for maintaining the desired temperature of the room.

The operation of this thermostat will be set forth hereinafter when explaining the operation of the device.

As heretofore stated, the heater structure contains an outer casing 1 and an inner casing 2 and the inner casing contains at its lower end the baffles that have been referred to. Attention is directed at this point that the thermostatic member 12 is located between the inner ends of the baffles 3 and below the baffle 4. The baffles 3 are imperforate while the baffle 4 above is provided with openings 37 and the baffle 5 is provided with suitable openings 38 and the upper baffle 6 is provided with openings 39. From this it will be observed that the air passing to the heater flows through its open bottom portion 40 passing between the inner ends of the baffles 3 and around the thermostatic member 12. From thence it passes upward through the other baffles and also laterally past the standards 41 that are located at opposite corners of the said inner casing and serve to support the said casing.

The burners 10 and 11 are located above all of the said baffles and these burners cause an upward draught of the air as will be understood.

Construction of burners and thermostat

Figure 1:
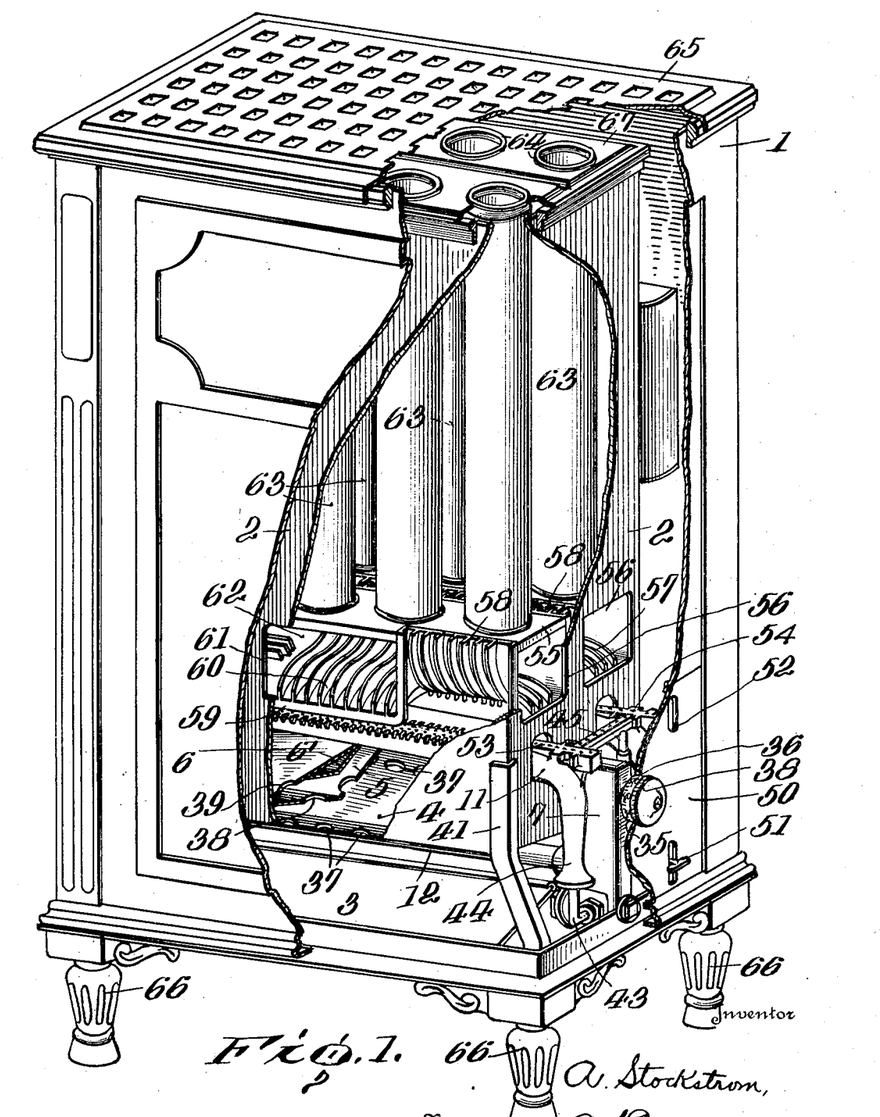
Figure 1 is a sectional perspective view of a heater embodying the invention.
Figure 2:
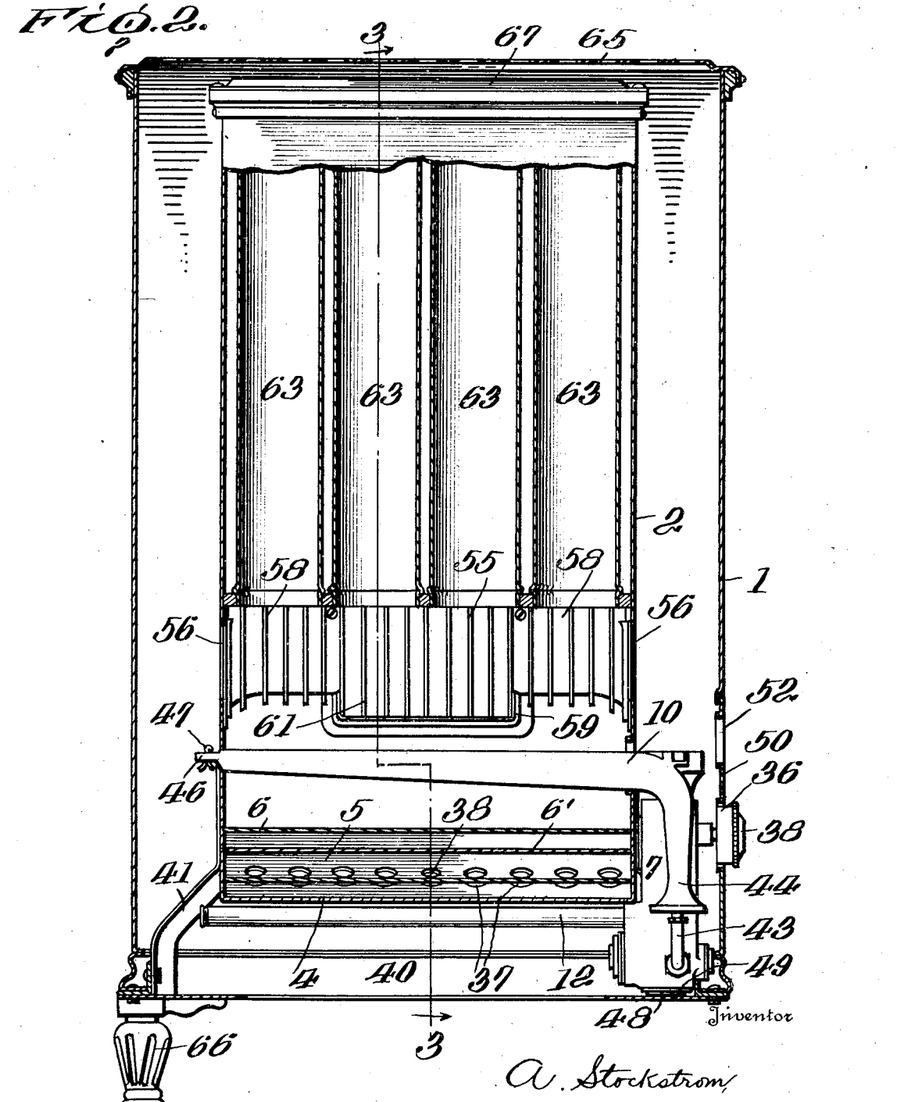
Figure 2 is a vertical longitudinal sectional view of the heater on a line 2—2 of Fig. 3.
Figure 3:
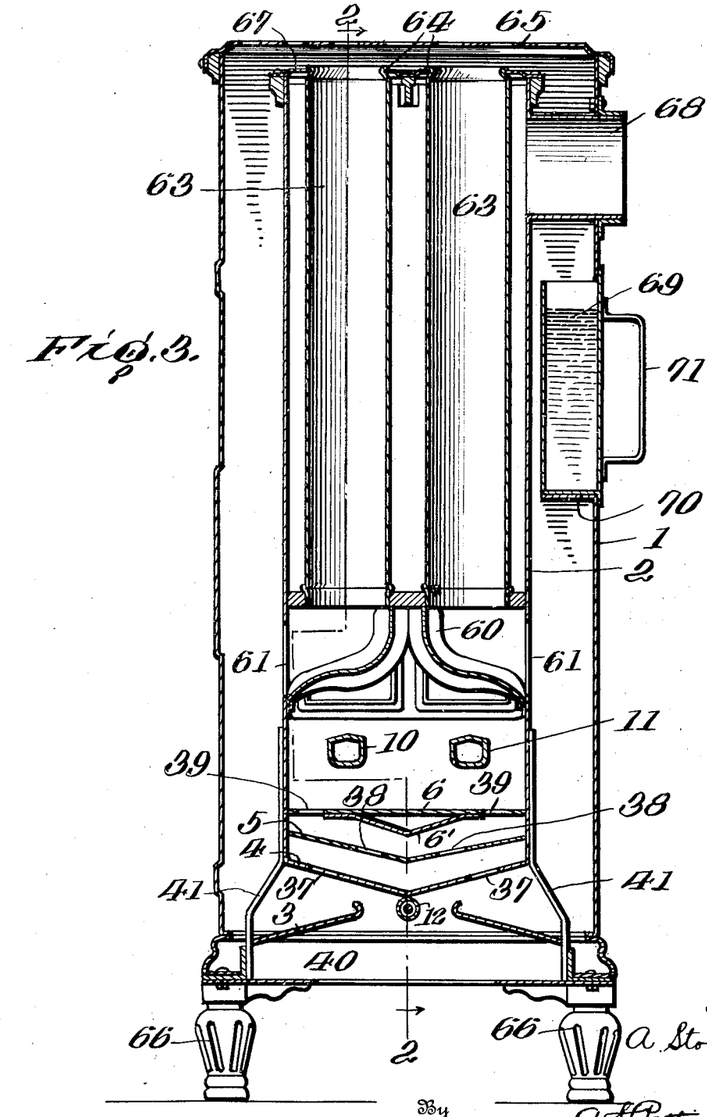
Figure 3 is a vertical cross section on a line 3—3 of Fig. 2.
Figure 4:
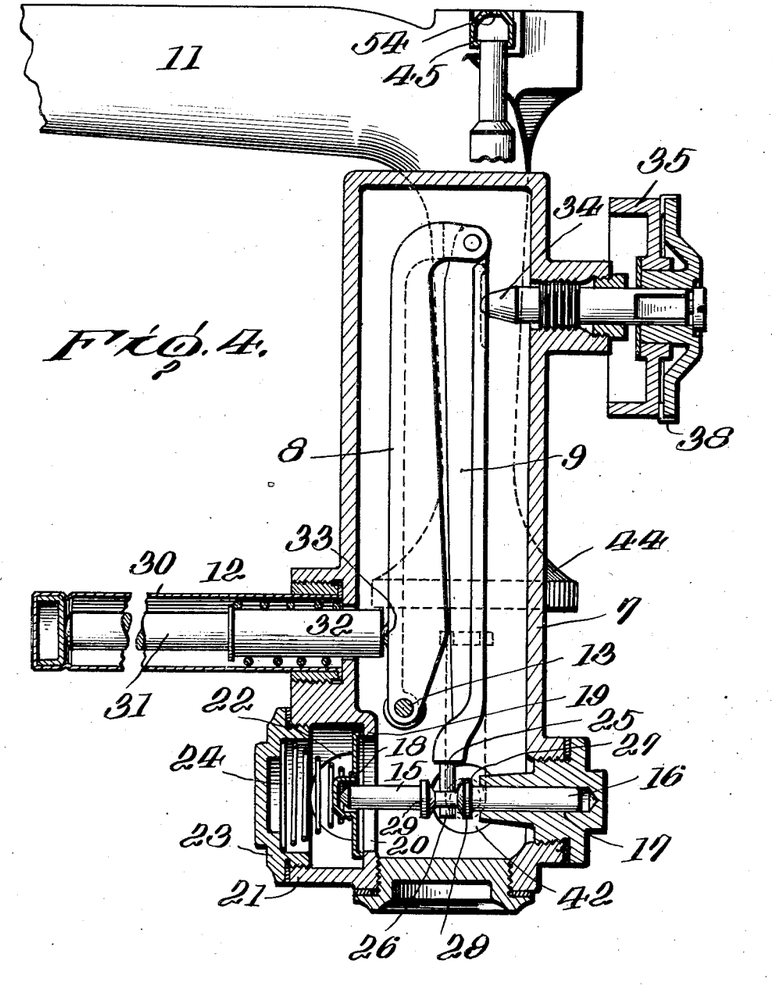
Figure 4 is a detached vertical sectional view of the thermostat and part of one of its burners.

It will be seen by reference to Figures 1 and 2 that the lower end of the housing 7 that contains the operating parts of the thermostat has at its lower end gas outlet openings 42 and suitable gas pipes 43 are connected with the lower end of the housing. When the gas valve 19 is open the gas flows in and fills the housing 7 and it flows from the housing through the gas outlets 42 into the gas pipes 43. The upper ends of the gas pipes 43 extend into the open lower end of the gas manifolds 44, and the upper ends of the pipes 43 are provided with suitable well known nipples (not shown) and the lower ends of said manifolds 44 are provided with the usual shutters (not shown) for controlling the flow of air to the lower end of said manifolds 44. The upper ends of the manifolds 44 are made as a part of the burners 10 and 11. A suitable pilot connection 45 is controlled by a valve 51, while the outer ends of the burners 10 and 11 extend through the inner casing 2 as at 46 through which extended ends ordinary cotter pins 47 pass. Attention is directed to the fact that the lower end 48 of the housing 7 rests on the imperforate ledge of the bottom 49 of the casing, thus supporting the housing containing the thermostatic members and that end of the manifolds and burners while the opposite ends of the burners are removably supported by the inner casing 2.

In Figures 1 and 2 a removable door 50 is placed, the said door extending to a point above the adjacent ends of the burners and manifolds and housing so that when it is desired to remove the unit consisting of said thermostat the manifolds and the burners, this door is removed and the cotter pins 47 removed. For the purpose of lighting the said burners an opening 52 is provided through which opening a lighted match is inserted when the gas passing through the openings 53 and 54 in the adjacent ends of the burners will light and in turn light the burners throughout their length.

Housing construction

Located within the inner casing 2 a suitable distance above the burners 10 and 11 is a hollow structure 55 which consists of a casting. The outer open ends of the hollow structure communicate with openings 56 formed in the inner casing 2, the said casting fitting tightly against the inner side of the said casing 2. The inner sides of this casting is provided with a suitable number of ribs 57, the said ribs extending in the direction shown though they may extend in other suitable directions.

The outer sides of the ends of this casting are provided with suitable ribs 58 and the central portion of this casting is enlarged as shown at 59 and are provided with a plurality of ribs 60 that are cast thereon. These enlargements are on the outer side, so to speak, of the said casting since the enlargement 59 communicates with an opening 61 formed in the inner casing 2 and it fits tightly also against the inner side of the said casing, the enlargement forming in effect an opening 62 which communicates with vertical pipes 63 that communicate with the interior of the hollow casting through their top and the upper open ends 64 pass through the top of the inner casing 2. Located above the top of the inner casing 2 and above the upper ends 64 of the pipes 63 is a suitable perforated top 65 that fits on the outer casing 1.

In the structure here shown the casings are supported above the floor on suitable legs 66, and the burners 10 and 11 being lighted air is drawn upward between the baffle plates 3 and against the thermostatic member 12. It is understood of course that when the temperature of the thermostatic member 12 has not reached the degree to which the member 38 is adjusted, that the gas valve 19 is open to supply gas for the burners. The cold air passes through the openings 37 of the baffle plate 4 and laterally past the legs 41 into the space between the inner and outer casings 2 and 1.

The air that passes through the openings of the baffle 4 is within the lower end of the inner casing 2 and it then flows upward through the baffle 5 and the baffle 6 and the burners 10 and 11. These baffle plates perform the double function of regulating the amount of air that flows into the lower end of the inner casing and these baffles prevent the heat being radiated from the burners 10 and 11 downward to strike the thermostatic member 12 whereby the thermostatic member is not affected by the heat of the burners above but is only affected by the heat of the air of the room, and that heat being substantially at the floor is the coldest contained in the said room.

The products of combustion flow upward within the inner casing 2 which is closed at its upper end by a suitable cap 67 and out through a pipe 68 that communicates with a suitable flue (not shown). The air to be heated passes through the openings 56 into the hollow casting 55 and thence to the lower ends of the vertical tubes 63 and out through their upper open ends 64.

The heat from the burners 10 and 11 is partly absorbed by the ribs 58 which are on the outer side of the hollow casting and this heat is conducted through the said casting to their inner side where the heat from the ribs 57 and 60 further heats the air that passes from the structure through the tubes 63.

This housing therefore constitutes an air circulating medium and heats the air as it circulates through the structure while at the same time heat to some extent is absorbed by the outer casing 1 and heats the air around the said casing 1.

Located within the space between the outer and inner casings 1 and 2 is a suitable water reservoir 69 whereby moisture therefrom is absorbed by the air and it flows through the perforated top 65. This reservoir is removable through an opening 70 in which it is inserted by means of a handle 71. By removing the said reservoir it can be supplied with water when needed.

*Operation of thermostat*

Assuming the valve 19 to be open gas enters the extension 21 through the opening 22 and it then passes around the valve 19 and through the opening 20 into the housing 7. The outlet 42 in the housing may be placed differently from that here shown, but the location here shown is the most convenient for the burner structure in that it makes a direct communication with the manifolds 44 through which the gas passes to the burners 10 and 11. The wheel 35 and the member 34 being adjusted to cause the lower end of the lever 9 to hold the valve 19 open in open position it remains until the thermostat 12 acts on the lever 8 to cause the lever 9 to move outward when the gas valve 19 will either close or partially close for cutting off the flow of gas.

A suitable pilot burner 45 will be located adjacent any part of the burner so that in operation should the gas valve 19 close the pilot will continue to burn and when the gas valve again opens the burners will be lighted by the pilot, this being the ordinary construction which will be readily understood. Also in the gas supply pipe (not shown) that is connected with the gas opening 22 will be provided an ordinary hand operated valve (not shown) for the purpose of turning on and turning off the gas. If the gas is turned off by this hand device then when it is turned on again it will be necessary to light the burners through the opening 52 which will light the pilot as well as the burners. With the gas turned on however it will be unnecessary to light the burners through the opening 52 since that will be taken care of by the pilot light.

The inner end 34 is hardened steel and is attached to the shaft to which the regulator wheel is connected. By the double lever arrangement here shown the device is not so sensitive to a slight movement of the wheel because the end 35 engages the second lever 9 near its pivoted end and it is possible to regulate the wheel by a 50 degree graduation thereof. This therefore provides ample adjustment and an adjustment which does not require exceptionally fine threads on the shaft of the regulating wheel 35. The foregoing adjustment is accomplished by the double lever arrangement and by the fact that the thermostatic member engages the lever 8 near its lower pivoted end and that the shaft 34 engages the lever 9 near its upper end where it is pivotally attached to the lever 8.

From the foregoing description it will be seen that the present invention embodies a thermostatically controlled gas heater so constructed that the thermostat, the burner and burner manifolds are readily bodily removable from the heater structure for the purpose of examining them should occasion arise therefor, or for the purpose of repairing any part of this unit.

It will also be observed that in this structure I have provided means whereby the heating members consist of two elongated parallel burners each having its separate connection with the gas and the theromstatic housing and the said burners located below a heating arrangement that causes all of the air that is to be heated to flow directly by the thermostat member and that the thermostatic member is so placed that the heat radiation from the burners is not conveyed to the thermostat whereby the operation of the thermostat depends solely upon the fresh air that is supplied to the heater. In this way I am enabled to make a heater in which the thermostat is directly controlled by the cold air of the room which enables the air in the room to be sufficiently heated. This device is constructed and it operates on a principle that involves the idea that the heater has a capacity sufficiently great to heat the air of the room and that when this is true then the construction of the heater combined with the location of the thermostatic member that is embodied therein heats the room to the required capacity for the comfort of the occupants thereof.

In fact I find by operation that the heater maintains the room in which it is placed within two or three degrees of the thermostatic setting, provided the capacity of the heater is sufficient to so heat the room.

It will also be understood that the heater construction combined with the burner and thermostat causes a circulation therein of the air to be heated and the construction of the heating elements is such as to make them capable of absorbing the heat of the burners and giving out this absorbed heat to the passing currents of cool air.

I wish it understood that the invention is not limited to the exact construction here shown but that it may be varied within certain limits without departing from the spirit of the invention so long as the variation is within a fair interpretation of the attached claims.

What I claim and desire to secure by Letters Patent is:

1. A thermostatically controlled gas heater comprising a vertically disposed housing, parallel burners located in the lower portion of said housing, said burners having separate vertically disposed manifolds, a thermostatic housing located between the said manifolds, said housing containing thermostatically operated members, a gas supply communicating with the said housing, the thermostatic members operated by a thermostatic member projecting below the said burners, for the purpose described.

2. A thermostatically controlled gas heater comprising a vertically disposed housing having inner and outer separated casings, an elongated burner extending substantially the width of the said housing, a thermostat housing located in a vertical line substantially between the said inner and outer casings, the burner having a manifold also similarly located, a gas supply communicating with the said housing, thermostatically controlled members in the said housing for controlling the flow of gas to the said burner, and a thermostat projecting parallel with the said burner and separated therefrom by baffle plates, the parts combined for the purpose specified.

3. A thermostatically controlled gas heater comprising a vertically disposed housing having inner and outer separated casings, a horizontal disposed hollow member having its open ends communicating with said space formed by the inner and outer casings, vertically arranged tubes having their lower ends communicating with the interior of the hollow member and their upper ends communicating with the atmosphere, a burner located below the hollow member, a housing, said housing containing a thermostatically controlled member for controlling the flow of gas to the said burner, and the thermostat comprising a member extending below and separated from the said burner whereby the thermostatically controlled member is influenced by the upward flow of air.

4. A thermostatically controlled gas heater comprising inner and outer casings, the inner casing shorter than the outer casing, a burner located in the lower end of the inner casing, a thermostatic member located substantially wholly below the said burner and influenced by the passage of air upward to the lower end of the inner casing, a gas supply for the said burner, the thermostatic member adapted to control the gas supply to the said burner, substantially as specified.

5. A thermostatically controlled gas heater, comprising a vertically arranged housing consisting of inner and outer casings, a burner located in the lower end of the lower casing, a horizontally extending hollow member spanning the lower end of the inner casing, the end of the hollow member communicating through the inner casing to the space between the said casings, the hollow member having centrally arranged passageways communicating with the interior of the hollow member and also with the space between the inner and outer casings, vertically arranged tubes having their lower ends communicating with the interior of the hollow member and their upper ends open and passing through the top of the inner casing, and a thermostatically controlled burner located below the said hollow member, means for supplying gas to the said burner and a thermostatically controlled member extending inward below and separated from the said burner for controlling the supply of gas to the said burner, the parts operating as specified.

6. A thermostatically controlled gas heater comprising a vertically arranged housing consisting of inner and outer separated casings, parallel horizontal hollow members located in the lower end of the inner casing the outer ends of the hollow members communicating through the inner casing with the space between the inner and outer casings, parallel elongated burners located in said inner casing and wholly under the said horizontal members, a gas supply for the said burners, a thermostatically controlled member located below the said members and influenced by the upward passage of air thereby, said thermostatically controlled member regulating the flow of gas to the said burners, the parts operating for the purpose specified.

7. A thermostatically controlled gas heater comprising a vertically disposed housing consisting of inner and outer separated casings, flues located within the said inner casing, a burner located below the said flues and adapted to heat them, a gas supply communicating with the said burner, a thermostatically controlled member located below the said burner and a plurality of baffle plates located between the said burner and the thermostatically controlled member for preventing the downward radiation of heat from the burners to the thermostatically controlled member, whereby the parts operate as specified.

8. A thermostatically controlled gas heater comprising a housing consisting of inner and outer separated vertical casings, a horizontal flue spanning the lower portion of the inner casing and having its open ends communicating through the said inner casing to the space between it and the outer casing, burners located below the said flue and extending through the inner casing into the space between the said casings, thermostatically operated mechanism located in the said space, and a thermostatic member located wholly below the said burner, gas supplied for the said burner, the said thermostatic member controlling the flow of gas to the burner, for the purpose specified.

9. A thermostatically controlled gas heater comprising vertically arranged separated casings, flues spanning the lower portion of the inner casing and communicating through it to the space between the inner and the outer casing, a burner for each flue in the said inner casing and below the said flues, the said burners extending through the inner casing to a space between it and the outer casing, the ends of the burners in said space connected by a hollow member, a gas supply for the said burners, a thermostatic member located below the said burners and influenced by the upward passage of air thereby, said thermostatic member controlling the said gas supply, for the purpose specified.

10. In a thermostatically controlled heater, the combination of a casing having its lower end above the lower end of the heater, said casing having an air inlet at its lower portion and an air outlet at its upper portion, of a gas burner extending horizontally across the lower portion of the casing, said burner having a gas inlet and a horizontally elongated thermostatic member extending parallel to the said burner and controlling the gas inlet to the burner, the parts operating substantially as described.

11. A thermostatically controlled heater comprising a casing having an air inlet at its lower portion and an air outlet at its upper portion, of two elongated parallel burners extending substantially across the said heater, said burners having each separate gas inlets and a thermostatic member located below and in a vertical line between said burners and controlling the supply of gas to the burners, the parts operating substantially as described.

12. A heater comprising a casing having a horizontally extending air receiving passage extending substantially across its lower end, a horizontal gas burner located in the casing below the said horizontal air passage, said burner being substantially of the same length as said air passage, a gas passage communicating with the said burner, and a thermostatic member located below and in a vertical line between the burner and controlling the passage of gas to the burner, the parts operating as specified.

13. A gas heater comprising a casing having a plurality of horizontally extending air passages and a plurality of vertically extending air passages located thereabove, a gas burner located below the said horizontal passages having a gas supply connected therewith, and a thermostatic member located in said casing and in a vertical line at one side of the burner and controlling the flow of gas to the burner, the parts operating substantially as described.

14. A heater comprising a casing having a plurality of hollow horizontal air passages provided with laterally extending flanges, passages located above the horizontal passages, a burner extending substantially throughout the length of the said horizontal passages and having a gas supply inlet and a thermostatic member located in said casing and in a vertical line at one side of the burner and controlling said gas supply, substantially as set forth.

15. A gas heater comprising a casing having horizontal air passages at its lower portion and vertically arranged air passages thereabove and a horizontal burner extending through the casing below the said air passage and a thermostatic member located in said casing and in a vertical line at one side of the burner, the burner and the thermostatic member forming a unit removable from the said casing, substantially as specified.

16. A gas heater comprising an inner casing having horizontally extending hollow members forming air passages, an outer casing the hollow members communicating with the space between the inner and outer casing, an air inlet for the lower casing adapted to circulate air around the horizontal passageways independently of the hollow members and a burner located below the horizontal members and a thermostat member located in said outer casing and in a vertical line at one side of the burner and adapted to control the flow of gas to the said burner, the parts operating for the purpose specified.

17. A gas heater comprising inner and outer separated casings, horizontal hollow members having their open ends communicating with the space between the casings, vertically arranged tubular members having their lower ends communicating with the hollow members and their upper ends having an air inlet, horizontally elongated burners located within the inner casing and below the horizontal members, the inner casing having baffle plates controlling the air thereto and around the horizontal hollow members, and a thermostatic member located in a vertical line at one side of the said burner and controlling the flow of gas to the burner, the parts operating for the purpose specified.

18. A thermostatically controlled gas heater comprising a housing and a removable unit located in the said housing, said unit comprising two horizontal burners extending substantially across the lower end of the said housing, a combined thermostatic and gas supply housing located between the ends of said burners at one end, the adjacent ends of the burners connected with the said thermostatic and gas supply housing whereby the members constituting the said unit can be attached to and removed from the said housing as set forth.

19. A thermostatically controlled gas heater comprising a vertically disposed housing having an air inlet at its lower end and members above its lower end adapted to be heated, and a thermostatically controlled burner located between said lower end of the housing and the members to be heated, said thermostatically controlled burner comprising a horizontal portion substantially extending across the lower end of the said housing, and a thermostatic member controlling the passage of gas to the said burner and located below the said burner and at the air inlet, whereby the said thermostatic member is controlled by the cold air passing to the said housing, substantially as set forth.

20. A thermostatically controlled heater comprising a vertical housing containing members to be heated that are located above the end of the said housing, baffle plates located in the lower end of the housing and removed from the said heated members, a horizontally extending gas burner located between the heated members and the baffle plates, and a thermostatic member located below the said baffle plates and controlling the flow of gas to the said burner, the parts arranged and operating as set forth.

21. A thermostatically controlled gas heater comprising a vertically arranged housing, a gas burner extending horizontally substantially across the housing above it lower end, baffle plates located in the housing below the said burner and members located in the housing above the said burner, a vertically arranged thermostatic housing at one end of the said burner, a horizontally arranged thermostatic member located below the baffle plates extending from the said vertically arranged housing, means within the housing controlling the flow of gas and operated by the said thermostatic member, the parts arranged and operating substantially as set forth.

22. A thermostatically controlled gas heater comprising an inner vertically arranged housing having adjacent its lower end a horizontally arranged hollow casting having its ends and sides opening through the said housing, vertically arranged tubes with their lower ends communicating with the hollow casting and their upper ends communicating outside of the said housing, a horizontal burner located below the said casting and extending parallel with it, a thermostatic and gas housing located outside of the first mentioned housing, gas connections between the last mentioned housing and supplying gas to the burner, and a thermostatic member extending parallel with the said burner and located below the said burner substantially at the inlet end of the said housing, the parts operating for the purpose specified.

23. A thermostatically controlled gas heater comprising a vertically arranged housing, a horizontally arranged hollow casting having its end communicating outside of the said housing, a horizontally arranged gas burner located below the said casting and extending parallel with it, said housing having an air opening at its lower portion, a thermostatic and gas housing located at one end of the said burner, an inwardly extending thermostatic member located below the said burner and substantially at the said air inlet of the housing, the burner communicating with the thermostatic and gas housing and the thermostatic member controlling the flow of gas to the burner, the parts operating substantially as specified.

In testimony whereof I hereunto affix my signature.

ARTHUR STOCKSTROM.